Nov. 3, 1959      D. C. BOWMAN      2,911,638
CATHODE RAY TUBE DEFLECTION CIRCUIT CONTROL APPARATUS
Filed April 12, 1957
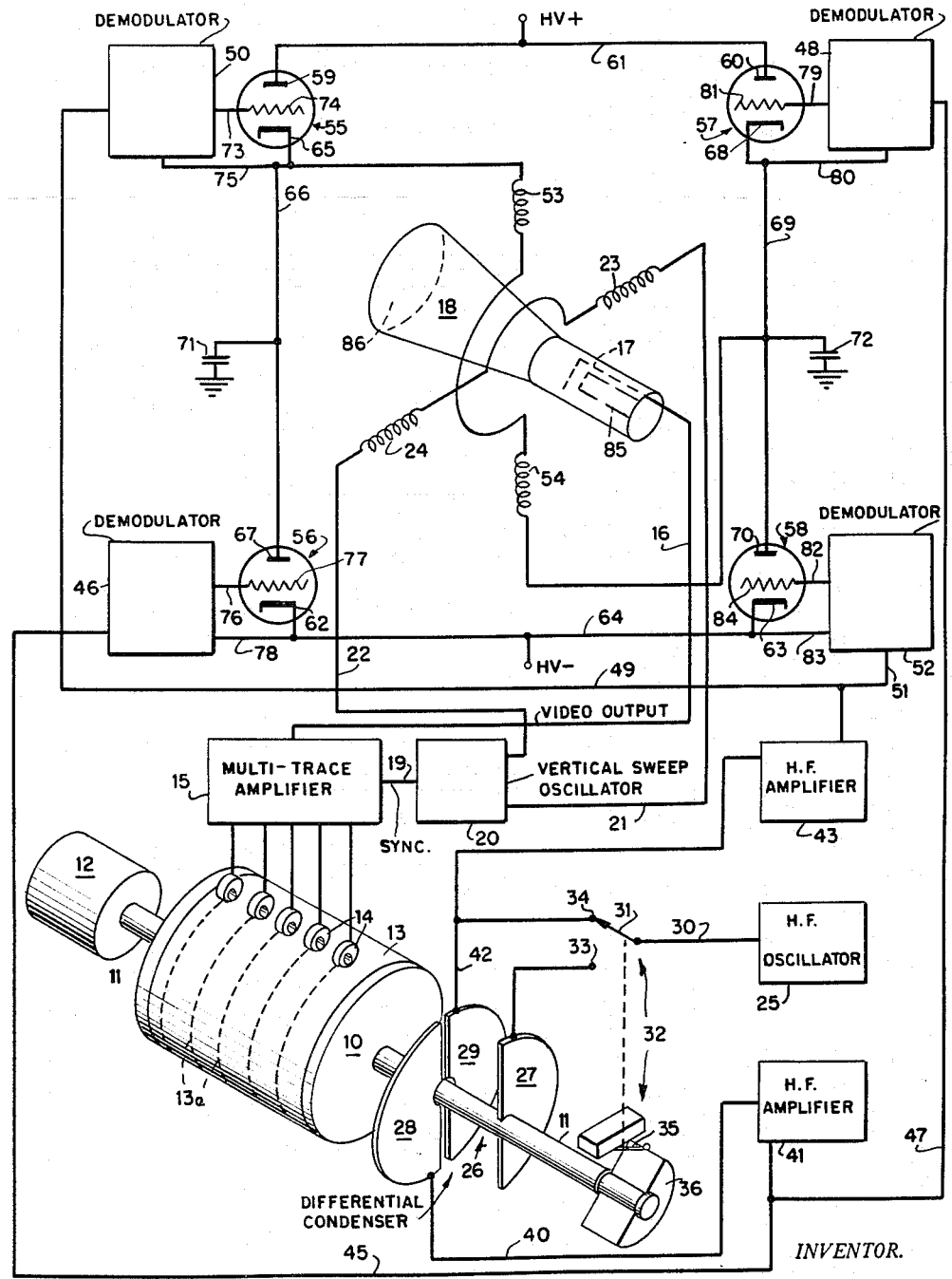
INVENTOR.
Donald C. Bowman
BY
Adams, Forward and McLean
ATTORNEYS United States Patent Office 2,911,638
Patented Nov. 3, 1959

2,911,638

CATHODE RAY TUBE DEFLECTION CIRCUIT CONTROL APPARATUS

Donald C. Bowman, Tulsa, Okla., assignor to Sinclair Oil & Gas Company, Tulsa, Okla., a corporation of Maine Application April 12, 1957, Serial No. 652,460

4 Claims. (Cl. 340—324)

My invention relates to control of unidirectional energy and in particular provides an apparatus for controlling polarity and amplitude of unidirectional energy applied to a driven load, such as an electromagnetic deflection yoke.

It is frequently necessary to apply electric power to a load in a manner which varies so slowly in amplitude and polarity that the conventional transformer coupling devices are unsuitable. For example, in a cathode ray tube display device for displaying seismic reflection data where the repetitive horizontal scan period is on the order of six seconds, the usual saw-tooth oscillators and transformer couplings are not practical. In many instances seismic reflection data are recorded on magnetic tape which is played back on a rotating drum and which may include as many as twenty-four channels of separately recorded data. Proper visual display of these data requires synchronization of the drum rotation rate with the horizontal sweep of the displaying cathode ray tube, as is described, for example, in my copending application Serial No. 462,468, filed October 15, 1954, now Patent No. 2,845,615, dated July 29, 1958. The visual display of seismic reflection data, moreover, is greatly benefited by varying the rate of mechanical playback devices in order to simplify the filtering techniques. Equivalent variation in the synchronized horizontal sweep rate of the displaying cathode ray tube is, therefore, advantageous.

Accordingly, it is an important object of my invention to provide a driving apparatus particularly suitable for driving an electromagnetic deflection yoke at slow rates of change in amplitude and polarity of the applied potential.

It is another object of my invention to provide a driving apparatus having flexible control of the rates of change of polarity and amplitude.

It is still another object of my invention to provide a driving apparatus for an electromagnetic deflection yoke which is capable of synchronization with mechanical devices, such as magnetic tape drums.

These and other objects of my invention are essentially obtained employing a driving apparatus in the form of a bridge circuit for controlling the flow of unidirectional energy applied to one pair of conjugate points and applied to a driven load from the other pair of conjugate points. The bridge circuit includes an electron tube in each of at least two adjacent legs and the same sort or another kind of impedance device in each of its remaining legs, if any. A high frequency signal is coupled to the two electron tubes to control their impedance through a differential condenser, or the like, and separate demodulators. As the differential condenser is varied differentially to proportion the amounts of signal coupled to each of the demodulators, the demodulated control signal coupled to the electron tubes varies differentially in accordance with the position of the differential condenser, thus varying the impedances of the electron tubes in the bridge circuit differentially and causing the amplitude and polarity of the potential applied to the driven load to vary as a function of the mechanical position of the differential condenser.

In a more particular aspect of my invention, the bridge circuit includes four electron tubes, one in each leg, with the electron tubes in opposite legs coupled through separate demodulators to opposite sides of the differential condenser.

For a more complete understanding of the principles of my invention, reference is made to the appended drawing which schematically and somewhat diagrammatically represents a suitable electrical system embodying the driving apparatus of my invention to control display of multichannel seismic reflection data on a cathode ray tube oscilloscope.

In the drawing, the reference numeral 10 designates a magnetic tape playback drum which is rotatably mouned on a shaft 11 driven by a motor 12. Drum 10 carries a multi-track magnetic tape 13, such as is conventionally employed in recording multiple geophone outputs of seismic reflection data. A series of magnetic pickups 14 are mounted adjacent to tape 13 and have their separate outputs connected to a multi-trace amplifier 15, for example, of the type described in my aforenoted copending application.

Multi-trace amplifier 15 has two outputs, one a video output connected through line 16 as a control voltage for the control grid 17 of a cathode ray tube oscilloscope 18, and the other a sync output connected by line 19 to a vertical sweep oscillator 20. The sawtooth output of oscillator 20 is connected by lines 21 and 22 to the vertical deflection yoke coils 23 and 24 of cathode ray tube 18. A peculiarity of this type of multi-trace amplifier 15 is the necessity for synchronizing the horizontal sweep of the oscilloscope with the repetitive rate of playback of the recordings, indicated as dashed lines 13a, on magnetic tape 13, as is more fully described in my aforenoted copending application.

Horizontal sweep is obtained in accordance with my present invention employing a relatively high frequency oscillator 25 and a differential condenser 26. Differential condenser 26 in the illustrated case consists of a rotor plate 27, mounted on shaft 11 on which drum 10 is mounted, and of a pair of stator plates 28 and 29 disposed diametrically opposite each other parallel and adjacent to the plane of rotation of rotor 27. The output signal of oscillator 25 is connected by line 30 to the pole 31 of a single pole, double throw switch 32 having contacts 33 and 34.

Switch 32 is provided with an actuating arm 35 which cooperates with a semi-circular cam 36 carried on shaft 11. When switch 32 is in its normally biased position, and arm 35 is unactuated by cam 36, pole 31 connects output line 30 from oscillator 25 to contact 33. Contact 33 is connected to rotor plate 27 by a slip ring wiper or other conventional arrangement. Stator plate 28 is similarly connected by line 40 to an amplifier 41 for the high frequency signal, and stator plate 29 is connected by line 42 to a second amplifier 43 for the high frequency signal. It should be noted that by the expression high frequency, I refer to any alternating signal of relatively high frequency substantially above the highest anticipated playback frequency of drum 10. A 15 kilocycle frequency is preferred. When arm 35 is actuated by contact with cam 36, pole 31 connects output line 30 from oscillator 25 to contact 34 which is connected to line 42 and hence to amplifier 43.

The amplified high frequency output signal of amplifier 41 is connected by line 45 to a demodulator 46 and by line 47 to a demodulator 48. The amplified output signal of amplifier 43 is similarly connected by line 49 to a demodulator 50 and by line 51 to a demodulator 52.

Each of demodulators 46, 48, 50 and 52 includes conventional rectifier and filter circuits designed to rectify its respective high frequency input signal producing a D.C. voltage output of amplitude corresponding to the envelope of its high frequency input. Suitably also, the outputs of the demodulators are biased for proper operation of the electron tubes controlled thereby as will be more apparent hereinafter.

The horizontal deflection yoke, consisting of series coils 53 and 54, for cathode ray tube 18 is connected across a bridge circuit including four electron tubes 55, 56, 57 and 58 which form the four legs of the bridge circuit. Anodes 59 and 60 of tubes 55 and 57, respectively, are tied together by line 61 and connected to a suitable positive high voltage source. Similarly, cathodes 62 and 63 of tubes 56 and 58, respectively, are tied together by line 64, and connected to the negative side of the high voltage supply. The cathode 65 of tube 55 is tied by line 66 to the anode 67 of tube 56. Similarly, the cathode 68 of tube 57 is tied by line 69 to the anode 70 of tube 58. In this arrangement the series connection of coils 53 and 54 forming the vertical deflection yoke is connected across lines 66 and 69. Suitably, a filter condenser 71 is connected from line 66 to ground, and a filter condenser 72 is connected from line 69 to ground.

Demodulator 50 has the negative side of its D.C. output voltage connected by a line 73 to the control grid 74 of electron tube 55, and the positive side of its output is connected by line 75 to line 66, and hence to the cathode 65 of tube 55. Similarly, the negative side of demodulator 46 output is connected by line 76 to control grid 77 of tube 56 and has the positive side of its output connected by line 78 to cathode 62 of the same tube. Likewise, the output of demodulator 48 is connected by lines 79 and 80 to the control grid 81 and cathode 68, respectively, of tube 57, and the output of demodulator 52 is connected by lines 82 and 83 to the control grid 84 and cathode 63, respectively, of tube 58. The output of each of demodulators 46, 48, 50 and 52 can include fixed bias, where desired, to limit conduction in its associated tube 56, 57, 55 and 58 at zero control signal.

It will be evident referring to the over-all scheme described that rotation of shaft 11 by motor 12 will carry rotor blade 27 from a position adjacent to stator plate 28, to a position adjacent stator plate 29, and then back to the original position thus differentially coupling the output signal of oscillator 30 to amplifiers 41 and 43 with the consequence that the output voltages of demodulators 50 and 52 will rise and fall inversely with the output voltages of demodulators 46 and 48. It will be further noted that the high D.C. voltage applied across the bridge not only is divided in two branches, one including tubes 55 and 56 and the other including tubes 57 and 58, but current can pass through yoke coils 53 and 54 from one branch of the bridge to the other. In fact, except in a position of condenser 26 equally coupling amplifiers 41 and 43 to oscillator 25, current will always flow from one branch to the other.

When rotor 27 is adjacent to plate 29, all of the high frequency signal will be coupled to amplifier 43 and thus to demodulators 50 and 52, causing the latter to couple maximum negative control voltages to the grids of tubes 55 and 58. Desirably this maximum drives the tubes close to cut-off. Under these circumstances, substantially all current conducted from line 61 to line 64 will pass through tubes 57 and 56 causing a maximum voltage to appear across horizontal deflection coils 53 and 54 in one direction which, it will be assumed, holds the cathode ray beam from gun 85 of tube 18 to the extreme left of the phosphor screen 86 of tube 18.

As rotor plate 27 rotates to a position partially adjacent to stator plate 28, decreasing the signal coupled to amplifier 43 and increasingly coupling a signal to amplifier 41, tubes 55 and 58 begin to conduct, and the impedance of tubes 56 and 57, increases, thereby decreasing the flow of current through coils 53 and 54, and decreasing the voltage applied to the yoke permitting the cathode ray beam to move horizontally to the right on screen 86 of tube 18. As rotor plate 27 continues to rotate to a position equally adjacent to plates 28 and 29, all tubes will have approximately the same impedance, and no current will be conducted through the deflection yoke, nor will any voltage appear across it. At this point the cathode ray beam will be at the center of screen 86.

As rotor plate 27 continues to rotate, the cathode ray beam will continue to move right until it reaches the extreme right of screen 86 and the impedance of tubes 56 and 57 becomes almost infinite. At this point the rotor plate 27 will be entirely adjacent to plate 28, and substantially all current is conducted by tubes 55 and 58.

Continued operation of rotor 27 will produce the reverse effect; however, ordinarily it is desirable to have a saw-tooth driving voltage for a deflection yoke, and accordingly cam 36 is positioned on shaft 11 to operate arm 35 of switch 32, and throw pole 31 from contact 33 connected to rotor plate 27 to contact 34 connected to amplifier 43 immediately as rotor plate 27 begins to leave its position adjacent plate 28. This couples the entire output of oscillator 25 to amplifier 43, rendering tubes 56 and 57 immediately highly conductive and tubes 55 and 58 immediately substantially non-conductive, with the result that at the instant the cathode ray beam reaches the right of screen 86, the beam immediately is returned to the extreme left of screen 86 substantially eliminating retrace. In addition, it may prove desirable to connect the operation of switch 32 to a blanking circuit disconnecting video output line 16, or otherwise placing a high negative potential on control grid 17.

Thus, when it is desired to play back a multi-track recording 13 on drum 10, the outputs of pickups 14 by operation of amplifier 15 and sweep generator 20 produce a coordinated video output in line 16 and vertical sweep currents in yoke coils 23 and 24 to reproduce the separate data recorded on tracks 13a. Because the horizontal sweep is synchronized by differential condenser 26 with the rate of playback of recording 13, the cathode ray beam repeatedly reproduces the recorded data to produce a lasting visual representation of the data on screen 86.

It will be evident that while I have described the application of my invention with reference to a specific problem, the driving apparatus of my invention can suitably be employed to provide control of both amplitude and polarity of a unidirectional energy applied to a load at however slow a rate of speed is desired. Different characteristics can be imparted by suitable shaping of the plates of differential condenser 26. The bridge circuit can be simplified by eliminating one or two adjacent electron tubes, replacing them with other impedances, such as resistors, with, however, less efficiency. One or two demodulators can be eliminated and control of their associated electron tubes obtained by coupling the tubes to operate as slaves with the oppositely located electron tubes, or as opposingly active slaves coupled to adjacent electron tubes.

I claim:

1. An apparatus for driving a deflection circuit of a cathode ray tube in synchronism with the angular position of a continuously rotatable device, which apparatus includes a bridge circuit, an impedance device in each leg of the bridge circuit, two of said impedance devices being located in an adjacent pair of legs of the bridge circuit and each including an electron tube, each said electron tube having a cathode, a space current control electrode and an anode with said cathode and anode connected to opposite legs of said bridge circuit, means having a relatively high frequency alternating signal output, a pair of demodulator devices, each demodulator device having an output voltage which is a function of the wave envelope of an input signal of said high frequency, the output of one demodulator device being coupled to the control electrode of one of said electron tubes to vary the impedance thereof as a function of the wave envelope of high frequency signal input to said one demodulator device, the output of the other demodulator device being coupled to the control electrode of the other electron tube to vary the impedance thereof as a function of the wave envelope of high frequency signal input to said other demodulator device, variable means connected to said rotatable device to be driven thereby, coupling said high frequency signal output differentially to said pair of demodulator devices as a function of the position of said rotatable device, means for connecting a unidirectional energy source to one pair of conjugate points of the bridge circuit, and means for connecting said deflection circuit to the other pair of conjugate points of the bridge circuit.

2. An apparatus for driving a deflection circuit of a cathode ray tube in synchronism with the angular position of a continuously rotatable device, which apparatus includes a bridge circuit, an electron tube in each leg of the bridge circuit, each said electron tube having a cathode, a space current control electrode and an anode with said cathode and anode connected to opposite legs of said bridge circuit, means having a relatively high frequency alternating signal output, four demodulator devices, each demodulator device having an output voltage which is a function of the wave envelope of an input signal of said high frequency, the output of each demodulator device being coupled to the control electrode of a separate one of said electron tubes to vary the impedance thereof as a function of the wave envelope of high frequency signal input to said demodulator device, variable means connected to said rotatable device to be driven thereby coupling said high frequency signal output to one pair of said demodulator devices differentially to the other pair of said demodulator devices as a function of the position of said rotatable device, each of said pairs of demodulator devices being associated with opposite electron tubes in a bridge circuit, means for connecting a unidirectional energy source to one pair of conjugate points of the bridge circuit, and means for connecting said deflection circuit to the other pair of conjugate points of the bridge circuit.

3. An apparatus according to claim 2 in which said variable means includes a differential condenser.

4. An apparatus according to claim 3 in which said rotatable device is a magnetic recording tape receiving drum.

References Cited in the file of this patent

UNITED STATES PATENTS

| | | |
|---|---|---|
| 2,329,073 | Mitchell et al. | Sept. 7, 1943 |
| 2,490,167 | Storm | Dec. 6, 1949 |
| 2,498,103 | Wojciechowski | Feb. 21, 1950 |
| 2,502,887 | Rava | Apr. 4, 1950 |
| 2,590,104 | King | Mar. 25, 1952 |
| 2,644,103 | Fyler et al. | June 30, 1953 |
| 2,656,527 | Tillman | Oct. 20, 1953 |
| 2,728,028 | Carpenter, Jr. | Dec. 20, 1955 |
| 2,825,886 | Pittman | Mar. 4, 1958 |